(12) United States Patent
Zhao et al.

(10) Patent No.: US 9,560,616 B2
(45) Date of Patent: Jan. 31, 2017

(54) METHOD AND DEVICE FOR DETERMINING SYNCHRONOUS CELL

(71) Applicant: China Academy of Telecommunications Technology, Beijing (CN)

(72) Inventors: Yali Zhao, Beijing (CN); Fangli Xu, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 80 days.

(21) Appl. No.: 14/380,369

(22) PCT Filed: Feb. 22, 2013

(86) PCT No.: PCT/CN2013/071770
§ 371 (c)(1),
(2) Date: Aug. 21, 2014

(87) PCT Pub. No.: WO2013/123894
PCT Pub. Date: Aug. 29, 2013

(65) Prior Publication Data
US 2015/0003373 A1    Jan. 1, 2015

(30) Foreign Application Priority Data
Feb. 24, 2012   (CN) .......................... 2012 1 0046648

(51) Int. Cl.
*H04W 56/00*   (2009.01)
*H04L 27/26*   (2006.01)
(Continued)

(52) U.S. Cl.
CPC ........ *H04W 56/003* (2013.01); *H04L 27/2605* (2013.01); *H04W 48/00* (2013.01);
(Continued)

(58) Field of Classification Search
CPC .... H04W 56/00; H04W 72/02; H04W 56/003; H04W 48/00; H04W 72/0453; H04W 56/0015; H04W 4/06; H04W 72/005; H04W 72/042; H04W 72/04; H04W 72/048; H04L 27/26; H04L 27/2605
See application file for complete search history.

(56) References Cited

U.S. PATENT DOCUMENTS

2011/0080885 A1   4/2011  Shin et al.
2011/0280223 A1*  11/2011  Maeda ................ H04W 72/082
                                                          370/335
(Continued)

FOREIGN PATENT DOCUMENTS

CN        101877911 A      11/2010
CN        101877911 A      11/2011
(Continued)

OTHER PUBLICATIONS

International Search Report for PCT/CN2013/071770.
(Continued)

*Primary Examiner* — Jae Y Lee
*Assistant Examiner* — Aixa Guadalupe-Cruz
(74) *Attorney, Agent, or Firm* — Kilpatrick Townsend & Stockton LLP

(57) ABSTRACT

Embodiments of the invention relate to the field of wireless communications and particularly to a method of and apparatus for determining a synchronous cell so as to determine a synchronous cell of an extension carrier so that the extension carrier is available between the network and a user equipment. The method of determining a synchronous cell according to the invention includes: a network-side apparatus determining an extension carrier to be configured for a user equipment; and the network-side apparatus determining a synchronous cell of the extension carrier upon determining that the extension carrier is a synchronous extension carrier.

(Continued)

The synchronous cell of the extension carrier can be determined so that the extension carrier is available between the network side and a user equipment to thereby improve the performance of the system.

16 Claims, 2 Drawing Sheets

(51) Int. Cl.
  *H04W 72/02* (2009.01)
  *H04W 48/00* (2009.01)
  *H04W 72/04* (2009.01)
(52) U.S. Cl.
  CPC ........ *H04W 72/02* (2013.01); *H04W 56/0015* (2013.01); *H04W 72/0453* (2013.01)

(56) References Cited

U.S. PATENT DOCUMENTS

| | | | |
|---|---|---|---|
| 2012/0213141 A1* | 8/2012 | Damnjanovic | H04W 72/005 370/312 |
| 2012/0236803 A1* | 9/2012 | Vujcic | H04W 72/048 370/329 |
| 2012/0287865 A1* | 11/2012 | Wu | H04W 74/006 370/329 |
| 2013/0315214 A1* | 11/2013 | Bai | H04L 5/001 370/336 |

FOREIGN PATENT DOCUMENTS

| | | |
|---|---|---|
| CN | 102625359 A | 8/2012 |
| WO | 2011/053974 A | 5/2011 |
| WO | 2011053974 A1 | 5/2011 |

OTHER PUBLICATIONS

R1-120163, Synchronization on new carrier type, Dresden, Germany, Feb. 6-10, 2012, 4 pages.

Supplementary European Search Report for EP 13751105, mailed Dec. 1, 2014, 10 pages.

LG Electronics: 'Synchronization aspects of extension carrier,' 3GPP Draft; R1-120422 Extension Carrier Sync, 3rd Generation Partnership Project-(3GPP), Mobile Competence Centre, Route Des Lucioles ; F-06921, Sophia-Antipolis Cedex ; France,vol. RAN WG1, No. Dresden, Germany; 20120206-20120210, Jan. 31, 2012 (Jan. 31, 2012), XP050562911, [retrieved on Jan. 31, 2012], 4 pages.

Apple Inc: 'On the Configuration and Usage of New Carrier Types', 3GPP Draft; R1-120271, 3rd Generation Partnership Project (3GPP), Mobile Competence Centre , 650, Route Des Lucioles ; F-06921 Sophia-Antipolis Cedex; France, vol. RAN WG1, No. Dresden, Germany; 20120206-20120210, Feb. 1, 2012 (Feb. 1, 2012), XP050563181, [retrieved on Feb. 1, 2012], 6 pages.

Motorola Mobility: "Additional Carrier Types for LTE Rel-11", 3GPP Draft; R1-113260—Additional Carrier Types for Rel-11-, 3rd Generation Partnership Project (3GPP), Mobile Competence Centre ; 650, Route Des Lucioles ; F-06921-Antipolis Cedex; France, vo I. RAN WG1, No. Zhuhai; 20111010, Oct. 4, 2011 (Oct. 4, 2011), XP050538370, [retrieved on Oct. 4, 2011], 2 pages.

LG Electronics: "Consideration on Additional Carrier Type", 3GPP Draft; R1-112475 LG REL11 Consideration on Additional Carrier-Type, 3rd Generation Partnership Project (3GPP), Mobile Competence Centre ; 650, Route Des Lucioles ; F-06921 Sophia-Antipolis Cedex ; France,vol. RAN WG1, No. Athens, Greece; 20110822, Aug. 16, 2011 (Aug. 16, 2011), XP050537566, [retrieved on Aug. 16, 2011], 3 pages.

* cited by examiner

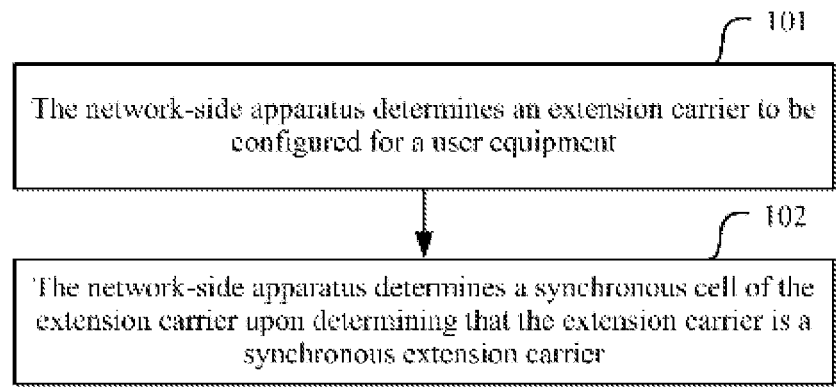
Fig.1
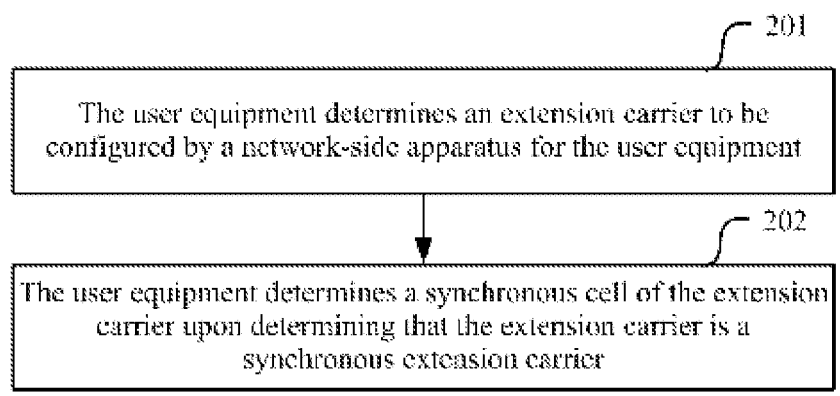
Fig.2
| R | R | Extension carrier index | Synchronous cell index |
Fig.3

METHOD AND DEVICE FOR DETERMINING SYNCHRONOUS CELL

This application is a US National Stage of International Application No. PCT/CN2013/071770, filed on Feb. 22, 2013, designating the United States, and claiming the benefit of Chinese Patent Application No. 201210046648.3, filed with the Chinese Patent Office on Feb. 24, 2012 and entitled "Method of and apparatus for determining synchronous cell", which is hereby incorporated by reference in its entirety.

FIELD OF THE INVENTION

The present invention relates to the field of wireless communications and particularly to a method of and apparatus for determining a synchronous cell.

BACKGROUND OF THE INVENTION

There are significantly improved required peak rates of a Long Term Evolution-Advanced (LTE-A) system up to 1 Gbps in the downlink and 500 Mbps in the uplink as compared with an LTE system. The LTE-A system is also required to be well compatible with the LTE system. Carrier Aggregation (CA) has been introduced to the LTE-A system to thereby accommodate the improved peak rates, compatibility with the LTE system and full use of spectrum resources as needed.

With carrier aggregation, a user equipment can operate concurrently over a plurality of cells in each of which there are a pair of uplink (UL)/downlink (DL) Component Carriers (CCs) instead of only one set of carriers in the LTE system and earlier wireless communication systems. The respective component carriers in the carrier aggregation-enabled system can be consecutive or inconsecutive, and bandwidths of the respective component carriers may be the same or different; and there is a bandwidth up to 20 MHz of each component carrier for compatibility with the LTE system. The number of cells that can be aggregated for the user equipment is typically up to 5 at present. Moreover the cells with carrier aggregation are further categorized in the LTE-A as follows:

A Primary Cell (PCell), where there is only one of the plurality of cells aggregated for the user equipment to be defined as a PCell selected by a base station and configured to the user equipment in Radio Resource Control (RRC) signaling. A Physical Uplink Control Channel (PUCCH) is configured only in the PCell; and A Secondary Cell (SCell), where all the other cells than the PCell aggregated for the user equipment are SCells.

In the CA system, the aggregated cells of the UE need to be searched frequently in some cell management procedures (e.g. deletion of a secondary cell, reconfiguration of a secondary cell, activation/deactivation of a secondary cell, reporting of a signal quality of a serving cell, etc.). Cells in an aggregation range each can be identified uniquely by a frequency and a Physical Cell ID (PCI). From the perspective of a signaling overhead, a cell index parameter can be introduced to avoid the two carrier parameters, frequency and PCI, and from being reused frequently. A UE-level cell index parameter encoded in 3 bits is to be introduced as decided in ongoing discussion of the standard, and the index of a cell will be allocated by the network to the UE when the cell is newly added. The cell index of the primary cell is fixed at 0, and the cell indexes of the secondary cells range from 1 to 7, Due to possibly fluctuating and bursting traffic of the user equipment, that is, a low amount of traffic in some period of time and a high amount of traffic in another period of time, the concept of activation/deactivation has been introduced to the LTE-A system for better conservation of power of the user equipment with a low amount of traffic, where it is specified that the PCell of the UE be prohibited from being deactivated but be kept activated all the time by default whereas the SCells can be activated/deactivated.

For a deactivated carrier, the UE neither needs to detect a Physical Downlink Control Channel (PDCCH)/receive a Physical Downlink Shared Channel (PDSCH) nor needs to transmit a Physical Uplink Shared Channel (PUSCH)/Sounding Reference Signal (SRS)/Channel Quality Indicator (CQI), etc. for a better power conservation effect.

With the LTE-A R11, downlink transmission enhancement has been decided by introducing a novel downlink carrier, referred here as to an downlink extension carrier, for improved spectrum efficiency, a better support of a heterogeneous network (HetNet) scenario and power conservation.

The downlink extension carrier is currently designed in the protocol by supporting at least two synchronous and asynchronous scenarios. In the synchronous scenario, the extension carrier is synchronized in time/frequency with at least one carrier/cell, aggregated for the user equipment, compatible backward with the LTE system, that is, the user equipment does not need to perform an additional downlink synchronization process on the extension carrier. In the asynchronous scenario, the extension carrier is not synchronized in time/frequency with any carrier/cell, aggregated for the user equipment, compatible backward with the LTE system, that is, the user equipment does need to perform an additional downlink synchronization process on the extension carrier.

At present there has not been a relevant mechanism to determine a synchronous cell of an extension carrier despite the defined extension carrier so that the extension carrier is unavailable at the network side and the user equipment.

SUMMARY OF THE INVENTION

Embodiments of the invention provide a method of and apparatus for determining a synchronous cell so as to determine a synchronous cell of an extension carrier so that the extension carrier is available at the network side and a user equipment.

An embodiment of the invention provides a method of determining a synchronous cell, the method including:

a network-side apparatus determining an extension carrier to be configured for a user equipment; and the network-side apparatus determining a synchronous cell of the extension carrier upon determining that the extension carrier is a synchronous extension carrier.

Preferably, before the network-side apparatus determines the synchronous cell of the extension carrier, the method further comprises:

determining, the network-side apparatus, that the user equipment supports a synchronous extension carrier.

Preferably, determining, by the network-side apparatus, that the user equipment supports a synchronous extension carrier comprises:

determining, by the network-side apparatus, from capability information reported by the user equipment whether the user equipment supports an extension carrier and/or a type of extension carrier supported by the user equipment.

Preferably, the capability information comprises a part or all of:

a protocol release supported by the user equipment;

a capability indicator of whether the user equipment supports an extension carrier; and a type indicator of an extension carrier supported by the user equipment.

Preferably, he network-side apparatus determines the synchronous cell by one of:

selecting a Primary Cell (PCell) as the synchronous cell; or selecting a cell with a same coverage as the extension carrier as the synchronous cell amongst LTE backward compatible cells which are configured, or configured and activated for the user equipment by network; or selecting a cell belonging to a same frequency band as the extension carrier or a cell with a central frequency spaced from the central frequency of the extension carrier by no more than a threshold as the synchronous cell amongst the LTE backward compatible cells which are configured, or configured and activated for the user equipment by the network; or selecting a cell with a same path loss as the extension carrier as the synchronous cell amongst the LTE backward compatible cells which are configured, or configured and activated for the user equipment by the network; or selecting a cell with a difference in path loss from the extension carrier being no more than a threshold as the synchronous cell amongst the LTE backward compatible cells which are configured, or configured and activated for the user equipment by the network; or selecting a cell with a highest cell index as the synchronous cell amongst the LTE backward compatible cells which are configured, or configured and activated for the user equipment by the network; or selecting a cell with a lowest cell index as the synchronous cell amongst the LTE backward compatible cells which are configured, or configured and activated for the user equipment by the network; or selecting a cell with a central frequency closest to and lower than the central frequency of the extension carrier as the synchronous cell amongst the LTE backward compatible cells which are configured, or configured and activated for the user equipment by the network; or selecting a cell with a central frequency closest to and higher than the central frequency of the extension carrier as the synchronous cell amongst the LTE backward compatible cells which are configured, or configured and activated for the user equipment by the network; or determining according to a cross-carrier scheduling relationship configured by the network that a cell scheduling the extension carrier is the synchronous cell.

Preferably, after the network-side apparatus determines the synchronous cell, the method further comprises:

notifying, by the network-side apparatus, the user equipment of an identifier of the determined synchronous cell in a broadcast or dedicated signaling.

Preferably, the dedicated signaling is Radio Resource Control (RRC) signaling or Media Access Control (MAC) signaling or Physical Control Channel (PDCCH) signaling.

Preferably, the identifier of the synchronous cell is a central frequency and a Physical Cell ID (PCI); or an Evolved Universal Mobile Telecommunication System (UMTS) Terrestrial Radio Access Network (EUTRAN) Cell Global Identity (ECGI); or a cell index.

Preferably, the synchronous cell is configured based upon system or based upon the user equipment.

Preferably, the method is applicable with one or a combination of:

downlink synchronization of the extension carrier with the synchronous cell;

a same path-loss reference for the extension carrier and the synchronous cell;

a same value of a mobility measurement result for the extension carrier and the synchronous cell;

deactivation of the extension carrier along with the synchronous cell;

scheduling of the extension carrier by the synchronous cell or by an Enhanced Physical Downlink Control Channel (E-PDCCH) of the extension carrier or by another cell configured at network side;

separate cell indexes of the extension carrier and the synchronous cell respectively;

a same downlink timing reference cell and a same uplink Timing Advance (TA) for uplink transmission to be used by the extension carrier and the synchronous cell if the extension carrier and the synchronous cell belong to a same TA group; and different downlink timing reference cells for uplink transmission to be used by the extension carrier and the synchronous cell if the extension carrier and the synchronous cell belong to different TA groups.

An embodiment of the invention provides another method of determining a synchronous cell, the method including:

a user equipment determining an extension carrier to be configured for the user equipment by a network-side apparatus; and the user equipment determining a synchronous cell of the extension carrier upon determining that the extension carrier is a synchronous extension carrier.

Preferably, before the user equipment determines the synchronous cell, the method further comprises:

reporting, by the user equipment, capability information of the user equipment to network side.

Preferably, the capability information comprises a part or all of:

a protocol release supported by the user equipment;

a capability indicator of whether the user equipment supports an extension carrier; and a type indicator of an extension carrier supported by the user equipment.

Preferably, the user equipment determines the synchronous cell by one of:

selecting a Primary Cell (PCell) as the synchronous cell; or selecting a cell with a highest cell index as the synchronous cell amongst the LTE backward compatible cells which are configured, or configured and activated for the user equipment by network; or selecting a cell with a lowest cell index as the synchronous cell amongst the LTE backward compatible cells which are configured, or configured and activated for the user equipment by the network; or selecting a cell with a central frequency closest to and lower than the central frequency of the extension carrier as the synchronous cell amongst the LTE backward compatible cells which are configured, or configured and activated for the user equipment by the network; or selecting a cell with a central frequency closest to and higher than the central frequency of the extension carrier as the synchronous cell amongst the LTE backward compatible cells which are configured, or configured and activated for the user equipment by the network; or determining according to a cross-carrier scheduling relationship configured by the network that a cell scheduling the extension carrier is the synchronous cell.

Preferably, determining, by the user equipment, the synchronous cell comprises:

determining, by the user equipment, that a cell corresponding to an identifier of synchronous cell received in a broadcast or dedicated signaling is a synchronous cell.

Preferably, the method is applicable with one or a combination of:

downlink synchronization of the extension carrier with the synchronous cell;

a same path-loss reference for the extension carrier and the synchronous cell;

a same value of a mobility measurement result for the extension carrier as the synchronous cell;

deactivation of the extension carrier along with the synchronous cell;

scheduling of the extension carrier by the synchronous cell or by an Enhanced Physical Downlink Control Channel (E-PDCCH) of the extension carrier or by another cell configured at network side;

separate cell indexes of the extension carrier and the synchronous cell respectively;

a same downlink timing reference cell and a same uplink Timing Advance (TA) for uplink transmission to be used by the extension carrier and the synchronous cell if the extension carrier and the synchronous cell belong to a same TA group; and different downlink timing reference cells for uplink transmission to be used by the extension carrier and the synchronous cell if the extension carrier and the synchronous cell belong to different TA groups.

An embodiment of the invention provides a network-side apparatus for determining a synchronous cell, the network-side apparatus including:

a first determination module configured to determine an extension carrier to be configured for a user equipment; and a first processing module configured to determine a synchronous cell of the extension carrier upon determining that the extension carrier is a synchronous extension carrier.

Preferably, the first processing module is further configured:

to determine the synchronous cell of the extension carrier upon determining that the user equipment supports a synchronous extension carrier.

Preferably, the first processing module is further configured:

to determine from capability information reported by the user equipment whether the user equipment supports an extension carrier and/or a type of extension carrier supported by the user equipment.

Preferably, the first processing module is further configured to determine the synchronous cell by one of:

selecting a Primary Cell (PCell) as the synchronous cell; or selecting a cell with a same coverage as the extension carrier as the synchronous cell amongst LTE backward compatible cells which are configured, or configured and activated for the user equipment by network; or selecting a cell belonging to a same frequency band as the extension carrier or a cell with a central frequency spaced from the central frequency of the extension carrier by no more than a threshold as the synchronous cell amongst the LTE backward compatible cells which are configured, or configured and activated for the user equipment by the network; or selecting a cell with a same path loss as the extension carrier as the synchronous cell amongst the LTE backward compatible cells which are configured, or configured and activated for the user equipment by the network; or selecting a cell with a difference in path loss from the extension carrier being no more than a threshold as the synchronous cell amongst the LTE backward compatible cells which are configured, or configured and activated for the user equipment by the network; or selecting a cell with a highest cell index as the synchronous cell amongst the LTE backward compatible cells which are configured, or configured and activated for the user equipment by the network; or selecting a cell with a lowest cell index as the synchronous cell amongst the LTE backward compatible cells which are configured, or configured and activated for the user equipment by the network; or selecting a cell with a central frequency closest to and lower than the central frequency of the extension carrier as the synchronous cell amongst the LTE backward compatible cells which are configured, or configured and activated for the user equipment by the network; or selecting a cell with a central frequency closest to and higher than the central frequency of the extension carrier as the synchronous cell amongst the LTE backward compatible cells which are configured, or configured and activated for the user equipment by the network; or determining according to a cross-carrier scheduling relationship configured by the network that a cell scheduling the extension carrier is the synchronous cell.

Preferably, the first processing module is further configured to notify the user equipment of an identifier of the determined synchronous cell in a broadcast or dedicated signaling.

An embodiment of the invention provides a user equipment for determining a synchronous cell, the user equipment including:

a second determination module configured to determine an extension carrier to be configured for the user equipment by a network-side apparatus: and a second processing module configured to determine a synchronous cell of the extension carrier upon determining that the extension carrier is a synchronous extension carrier.

Preferably, the second processing module is further configured:

to report capability information of the user equipment to the network side before determining the synchronous cell.

Preferably, the capability information comprises a part or all of:

a protocol release supported by the user equipment;

a capability indicator of whether the user equipment supports an extension carrier; and a type indicator of an extension carrier supported by the user equipment.

Preferably, the second processing module is further configured to determine the synchronous cell by one of:

selecting a Primary Cell (PCell) as the synchronous cell; or selecting a cell with a highest cell index as the synchronous cell amongst the LTE backward compatible cells which are configured, or configured and activated for the user equipment by network; or selecting a cell with a lowest cell index as the synchronous cell amongst the LTE backward compatible cells which are configured, or configured and activated for the user equipment by the network; or selecting a cell with a central frequency closest to and lower than the central frequency of the extension carrier as the synchronous cell amongst the LTE backward compatible cells which are configured, or configured and activated for the user equipment by the network; or selecting a cell with a central frequency closest to and higher than the central frequency of the extension carrier as the synchronous cell amongst the LTE backward compatible cells which are configured, or configured and activated for the user equipment by the network; or determining according to a cross-carrier scheduling relationship configured by the network that a cell scheduling the extension carrier is the synchronous cell.

Preferably, the second processing module is further configured:

to determine that a cell corresponding to an identifier of synchronous cell received in a broadcast or dedicated signaling is a synchronous cell.

With a method of and apparatus for determining a synchronous cell according to the embodiments of the invention, a network-side apparatus determines a synchronous cell of an extension carrier upon determining that the extension carrier is a synchronous extension carrier, and the synchronous cell of the extension carrier can be determined so that the extension carrier is available between the network side and a user equipment to thereby improve the performance of the system.

BRIEF DESCRIPTION OF THE DRAWINGS

FIG. 1 is a schematic flow chart of a method of determining a synchronous cell by a network-side apparatus according to an embodiment of the invention;

FIG. 2 is a schematic flow chart of a method of determining a synchronous cell by a user equipment according to an embodiment of the invention;

FIG. 3 is a schematic diagram of a new MAC CE format according to an embodiment of the invention;

DETAILED DESCRIPTION OF THE EMBODIMENTS

Figure 4:
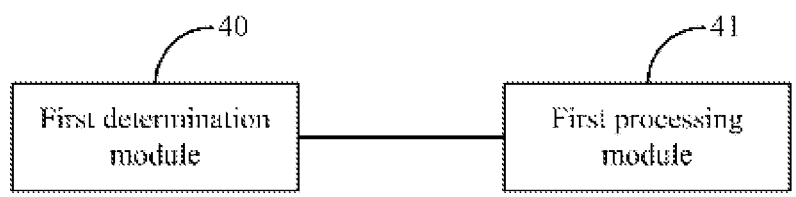
FIG. 4 is a schematic structural diagram of a network-side apparatus according to an embodiment of the invention.

With embodiments of the invention, a network-side apparatus determines a synchronous cell of an extension carrier to be configured for a user equipment upon determining that the extension carrier is a synchronous extension carrier; and the user equipment determines a synchronous cell of the extension carrier to be configured by the network-side apparatus for the user equipment upon determining that the extension carrier is a synchronous extension carrier. The synchronous cell of the extension carrier can be determined so that the extension carrier is available between the network side and the user equipment to thereby improve the performance of the system.

Where the synchronous cell can also be referred to as a synchronous carrier.

In an implementation, the extension carrier and the synchronous carrier can also be applicable with at least one of the following functions after being bound:

1. Downlink synchronization of the extension carrier with the synchronous cell:

2. The same path-loss reference for the extension carrier and the synchronous cell;

3. The same value of a mobility measurement result for the extension carrier and the synchronous carrier;

4. Deactivation of the extension carrier along with the synchronous cell:

5. Scheduling of the extension carrier by the synchronous cell or by an Enhanced Physical Downlink Control Channel (E-PDCCH) of the extension carrier or by another cell configured at the network side;

6. Separate cell indexes of the extension carrier and the synchronous cell respectively;

7. The same downlink timing reference cell and the same uplink Timing Advance (TA) for uplink transmission to be used by the extension carrier and the synchronous cell if the extension carrier and the synchronous cell belong to the same TA group; and 8. Different downlink timing reference cells for uplink transmission to be used by the extension carrier and the synchronous cell if the extension carrier and the synchronous cell belong to different TA groups.

The embodiments of the invention will be further described below in details with reference to the drawings of the invention.

As illustrated in FIG. 1, a method of determining a synchronous cell by a network-side apparatus according to an embodiment of the invention includes the following steps:

In the step 101, the network-side apparatus determines an extension carrier to be configured for a user equipment; and In the step 102, the network-side apparatus determines a synchronous cell of the extension carrier upon determining that the extension carrier is a synchronous extension carrier.

In an implementation, the network-side apparatus can determine the type of the extension carrier from capability information reported by the user equipment. Reference can be made to the following example for a particular implementation thereof, so a repeated description thereof will be omitted here.

Since not all the user equipments support a synchronous extension carrier, preferably the network-side apparatus firstly judges from the UE capability information reported by the user equipment whether the user equipment for which the extension carrier needs to be configured supports a synchronous extension carrier and then determines the synchronous cell of the extension carrier upon positive determination.

Particularly the network-side apparatus can determine from the capability information reported by the user equipment whether the user equipment supports an extension carrier and/or a type of extension carrier supported by the user equipment.

For example, if all the R11 UEs support a synchronous extension carrier in the system by default, then it will suffice if the UE capability information carries release information; and if R11 UE does not necessarily support a synchronous extension carrier in the system by default, then the UE capability information can carry a capability indicator of whether an extension carrier is supported and a type indicator of supported extension carrier or only the type indicator of supported extension carrier.

Preferably the capability information in the embodiment of the invention includes but will not be limited to a part or all of the following information:

A protocol release supported by the user equipment;

A capability indicator of whether the user equipment supports an extension carrier; and A type indicator of an extension carrier supported by the user equipment.

In an implementation, the network-side apparatus can determine a synchronous cell in a number of schemes, some of which will be described below by way of an example.

First Scheme to Determine Synchronous Cell

The network-side apparatus selects the cell with the highest cell index as the synchronous cell amongst the LTE backward compatible cells which are configured, or configured and activated for the user equipment by the network; or The network-side apparatus selects the cell with the lowest cell index as the synchronous cell amongst the LTE backward compatible cells which are configured, or configured and activated for the user equipment by the network; or The network-side apparatus selects the cell with a central frequency the closest to and lower than the central frequency of the extension carrier as the synchronous cell amongst the LTE backward compatible cells which are configured, or configured and activated for the user equipment by the network; or The network-side apparatus selects the cell with a central frequency the closest to and higher than the central frequency of the extension carrier as the synchronous cell amongst the LTE backward compatible cells which are configured, or configured and activated for the user equipment by the network.

Second Scheme to Determine Synchronous Cell

The network-side apparatus selects a PCell directly as a synchronous cell.

Third Scheme to Determine Synchronous Cell

The network-side apparatus determines according to a cross-carrier scheduling relationship configured at the network side that a cell scheduling the extension carrier is a synchronous cell.

Fourth Scheme to Determine Synchronous Cell

The network-side apparatus selects a cell with the same coverage as the extension carrier as a synchronous cell amongst LTE backward compatible cells which are configured, or configured and activated for the user equipment by the network; or The network-side apparatus selects a cell belonging to the same frequency band as the extension carrier or a cell with a central frequency spaced from the central frequency of the extension carrier by no more than a threshold as the synchronous cell amongst the LTE backward compatible cells which are configured, or configured and activated for the user equipment by the network; or The network-side apparatus selects a cell with the same path loss as the extension carrier as the synchronous cell amongst the LTE backward compatible cells which are configured, or configured and activated for the user equipment by the network; or The network-side apparatus selects a cell with the difference in path loss from the extension carrier being no more than a threshold as the synchronous cell amongst the LTE backward compatible cells which are configured, or configured and activated for the user equipment by the network.

The LTE backward compatible cells here include but will not be limited to cells in Release 8 (R8) to R10 systems.

Preferably after the step 102, the method can further include:

The network-side apparatus notifies the user equipment of the identifier of the determined synchronous cell in a broadcast or dedicated signaling.

Preferably if the network-side apparatus and the user equipment prescribe the second scheme or the third scheme above in use to determine a synchronous cell or prescribe one alternative of the first scheme above in use to determine a synchronous cell, then the synchronous cell determined by the network-side apparatus can be ensured to be the same as the synchronous cell determined by the user equipment so that the network-side apparatus may not notify the user equipment of the identifier of the determined synchronous cell to thereby save a resource and improve the transmission efficiency.

In an implementation, the network-side apparatus notifies the user equipment of the identifier of the determined synchronous cell in dedicated signaling including one of the following signaling without any limitation thereto:

RRC signaling;

Medium Access Control (MAC) signaling; and

Physical Downlink Control Channel (PDCCH) signaling.

Where the identifier of the synchronous cell in the embodiment of the invention includes but will not be limited to one of the following identifiers:

A frequency and a PCI;

An Evolved Universal Mobile Telecommunication System (UMTS) Terrestrial Radio Access Network (EUTRAN) Cell Global Identity (ECGI); and A cell index.

In an implementation, the synchronous cell can be configured based upon the system or can be configured based upon the user equipment.

"Configured based upon the system" means that binding of the extension carrier and the synchronous cell is configured based upon the system independent of the user equipment, that is, a synchronous cell corresponding to the same extension carrier in the system is the same for all the UEs; and "Configured based upon the user equipment" means that different user equipments are configured with the same extension carrier, and a synchronous cell of the same extension carrier may be different from one user equipment to another user equipment, for example, if user equipments A, B and C are configured with the same extension carrier Z, then the extension carrier Z of the user equipment A can be configured with a synchronous cell A1; the extension carrier Z of the user equipment B can be configured with a synchronous cell B1; and the extension carrier Z of the user equipment C can be configured with a synchronous cell C1.

In an implementation, the network-side apparatus according to the embodiment of the invention can be a Node B (e.g., a macro Node B, a home Node B, etc.) or can be a Relay Node (RN) or can be another network-side apparatus.

As illustrated in FIG. 2, a method of determining a synchronous cell by a user equipment according to an embodiment of the invention includes the following steps:

In the step 201, the user equipment determines an extension carrier to be configured by a network-side apparatus for the user equipment; and In the step 202, the user equipment determines a synchronous cell of the extension carrier upon determining that the extension carrier is a synchronous extension carrier.

In an implementation, if the user equipment can judge from UP capability information that the UE capability information indicates support of a synchronous extension carrier, then it can be determined that the extension carrier is a synchronous extension carrier or an asynchronous extension carrier, and if the UE capability information indicates support of only an asynchronous extension carrier, then only an asynchronous extension carrier can be configured.

If the user equipment supports a synchronous extension carrier, then the network-side apparatus typically determines a synchronous extension carrier mode thereof to thereby save some overhead so that more resources can be used for data transmission (some configuration of an asynchronous extension carrier, e.g., a PSS/CSS, may be absent for a synchronous extension carrier); and Due to different configuration information of a synchronous carrier from that of an asynchronous carrier, the user equipment can determine a result of determining the type of extension carrier at the network side upon reception of extension carrier configuration information of the network side. If it is a synchronous extension carrier, then the UE can determine a corresponding synchronous cell from indication information of the network-side apparatus or can determine a corresponding synchronous cell in a preset scheme.

Preferably before the step 202, the method can further include:

The user equipment reports capability information of the user equipment to the network side.

Preferably the capability information in the embodiment of the invention includes but will not be limited to a part or all of the following information:

A protocol release supported by the user equipment;

A capability indicator of whether the user equipment supports an extension carrier; and A type indicator of an extension carrier supported by the user equipment, e.g. a synchronous extension carrier or an asynchronous extension carrier.

In the step 202, the user equipment can determine the synchronous cell of the extension carrier on its own or can determine the synchronous cell of the extension carrier from a notification of the network side, both of which will be described below respectively.

I. The user equipment determines a synchronous cell of the extension carrier on its own:

Particularly the user equipment and the network-side apparatus can prescribe a scheme to determine a synchronous cell so that the synchronous cell determined at the network side can be ensured to be the same as the synchronous cell determined by the user equipment without any notification of the network side.

It can be prescribed in one of the following schemes without any limitation thereto:

In a first scheme to determine a synchronous cell, the network-side apparatus selects the cell with the highest cell index as the synchronous cell amongst the LTE backward compatible cells which are configured, or configured and activated for the user equipment by the network; or The network-side apparatus selects the cell with the lowest cell index as the synchronous cell amongst the LTE backward compatible cells which are configured, or configured and activated for the user equipment by the network; or The network-side apparatus selects the cell with a central frequency the closest to and lower than the central frequency of the extension carrier as the synchronous cell amongst the LTE backward compatible cells which are configured, or configured and activated for the user equipment by the network; or The network-side apparatus selects the cell with a central frequency the closest to and higher than the central frequency of the extension carrier as the synchronous cell amongst the LTE backward compatible cells which are configured, or configured and activated for the user equipment by the network.

In a second scheme to determine a synchronous cell, the network-side apparatus selects a PCell directly as a synchronous cell.

In a third scheme to determine a synchronous cell, the network-side apparatus determines according to a cross-carrier scheduling relationship configured by the network that a cell scheduling the extension carrier is the synchronous cell.

II. The user equipment determines a synchronous cell of the extension carrier from a notification of the network side.

Particularly the user equipment determines that a cell corresponding to an identifier of synchronous cell received in a broadcast or dedicated signaling is a synchronous cell.

In an implementation, if the network-side apparatus notifies the user equipment of the synchronous cell, then FIG. 1 and FIG. 2 can be integrated into a flow, that is, firstly the step 101 and the step 102 and then the step 201 and the step 202 are performed.

The inventive solution will be described below by way of several examples.

In a first example, the base station determines a synchronous cell of the extension carrier and configures the synchronous cell to the user equipment in RRC signaling (where the equipment needs to report a supported extension carrier aggregation capability).

In the step 1, the user equipment set ups an RRC connection with the base station over a cell 1 and reports whether the user equipment supports aggregation of an extension carrier and/or a type of aggregated extension carrier supported by the user equipment to the base station in a user equipment capability report procedure.

In the step 2, the base station needs to increase the number of aggregated cells for the user equipment, for example, needs to add a cell 2 compatible backward with an LTE system and an extension carrier cell 3, due to an increase in amount of traffic. The cell 2 can be added in substantially the same procedure as the addition of a SCell whereas the cell 3 needs to be added with special consideration.

In the step 3, the base station determines the type of the extension carrier 3 from a capability report of the user equipment, and if the capability report of the user equipment indicates that the user equipment supports only a synchronous extension carrier, then it can be determined that the type of the cell 3 is a synchronous extension carrier. If the capability report of the user equipment indicates that the user equipment supports both a synchronous extension carrier and an asynchronous extension carrier, then the base station determines whether the cell 3 is handled as a synchronous extension carrier or an asynchronous extension carrier dependent upon a condition of cells currently configured, or configured and activated for the user equipment by the base station, e.g. where there is a cell with the same frequency and coverage or the same transmission path as the extension carrier among cells, aggregated for the user equipment, compatible backward with the LTE system.

In the step 4, the base station configures the user equipment with the cell 2 and the cell 3.

For the extension carrier cell 3, if the base station determines that the type of the cell 3 is a synchronous extension carrier, then the cell 3 needs to be configured with a synchronous cell together with the addition thereof, and the extension carrier can be configured without any Primary Synchronization Signaling (PSS)/Secondary Synchronization Signaling (SSS). The synchronous cell can be configured by a frequency and a PCI or can be configured directly by a cell index if available.

In the step 5, the user equipment receives RRC signaling of adding the SCell, and if it includes the extension carrier and the configuration information of the extension carrier includes the configuration of the synchronous cell, then the user equipment handles the extension carrier as a synchronous extension carrier and determines the dependence of downlink synchronization of the extension carrier upon the synchronous cell thereof; otherwise, the user equipment handles the extension carrier as an asynchronous extension carrier and obtains a downlink timing of the extension carrier from its own signal transmission.

In the step 6, the base station can reconfigure the extension carrier with a synchronous cell in RRC signaling as needed.

In a second example, the base station determines a synchronous cell of the extension carrier and configures the synchronous cell to the user equipment in RRC signaling (where the equipment does not need to report a capability to aggregate a specific type of extension carrier).

In the step 1, the user equipment set ups an RRC connection with the base station over a cell 1.

In the step 2, the base station needs to increase the number of aggregated cells for the user equipment, for example, needs to add a cell 2 compatible backward with an LTE system and an extension carrier cell 3, due to an increase in amount of traffic. The cell 2 can be added in substantially the same procedure as the addition of a SCell whereas the cell 3 needs to be added with special consideration.

In the step 3, the base station determines from the release of the user equipment whether the user equipment supports aggregation of a synchronous extension carrier, and if the user equipment supports aggregation of a synchronous extension carrier, then the base station can determine whether there is a cell with the same frequency and coverage or the same transmission path as the extension carrier among cells currently supported by the base station or configured for the user equipment by the base station or configured and aggregated for the user equipment by the base station, and if so, then the base station can determine that the type of extension carrier is a synchronous extension carrier: otherwise, the base station can determine that the type of extension carrier is an asynchronous extension carrier.

In the step 4, the base station configures the user equipment with the cell 2 and the cell 3. For the extension carrier cell 3, if the base station determines that the type of the cell 3 is a synchronous extension carrier, then the cell 3 needs to be configured with a synchronous cell together with the addition thereof. The synchronous cell can be configured by a frequency and a PCI or can be configured directly by a cell index if available.

In the step 5, the user equipment receives RRC signaling of adding the SCell, and if it includes the extension carrier and the configuration information of the extension carrier includes the configuration of the synchronous cell, then the user equipment handles the extension carrier as a synchronous extension carrier and determines the dependence of downlink synchronization of the extension carrier upon the synchronous cell thereof; otherwise, the user equipment handles the extension carrier as an asynchronous extension carrier and obtains a downlink timing of the extension carrier from its own signal transmission.

In the step 6, the base station can reconfigure the extension carrier with a synchronous cell in RRC signaling as needed.

In a third example, the base station determines a synchronous cell of the extension carrier and configures the synchronous cell to the user equipment in MAC signaling.

In the step 1, the user equipment set ups an RRC connection with the base station over a cell 1 and reports whether the user equipment supports aggregation of an extension carrier and/or a type of aggregated extension carrier supported by the user equipment to the base station in a user equipment capability report procedure.

In the step 2, the base station needs to increase the number of aggregated cells for the user equipment, for example, needs to add a cell 2 compatible backward with an LTE system and an extension carrier cell 3, due to an increase in amount of traffic. The cell 2 can be added in substantially the same procedure as the addition of a SCell whereas the cell 3 needs to be added with special consideration.

In the step 3, the base station determines the type of the extension carrier 3 from a capability report of the user equipment, and if the capability report of the user equipment indicates that the user equipment supports only a synchronous extension carrier, then it can be determined that the type of the cell 3 is a synchronous extension carrier. If the capability report of the user equipment indicates that the user equipment supports both a synchronous extension carrier and an asynchronous extension carrier, then the base station determines whether the cell 3 is handled as a synchronous extension carrier or an asynchronous extension carrier dependent upon a condition of cells currently configured, or configured and activated for the user equipment by the base station, e.g. where there is a cell with the same frequency and coverage or the same transmission path as the extension carrier among cells, aggregated for the user equipment, compatible backward with the LTE system.

In the step 4, the base station configures the user equipment with the cell 2 and the cell 3. For the cell 3, if the base station determines that the type thereof is a synchronous extension carrier, then it can be configured without any PSS/SSS.

In the step 5, the base station needs to configure the user equipment with the extension carrier by notifying the user equipment of a synchronous cell of the extension carrier in an MAC Control Element (MAC CE).

Where the MAC CE can be used alone or can be combined with an activation/deactivation MAC CE into an MAC CE. For example, a first byte of the MAC CE indicates activation signaling, and a second byte indicates the synchronous cell corresponding to the extension carrier. A new Logical Channel ID (LCID) needs to be further introduced to identify the new MAC CE format. Reference can be made to FIG. 3 for a format of the MAC CE used alone by way of an example.

In the step 6, the base station needs to ensure the user equipment to be able to receive the configuration of the synchronous cell of the extension carrier before the extension carrier is activated. Once the user equipment receives the configuration of the synchronous cell of the extension carrier, the dependency of downlink synchronization of the extension carrier upon the synchronous cell thereof is determined; otherwise, where the user equipment receives no synchronous cell configuration, the user equipment handles the extension carrier as an asynchronous extension carrier and obtains a downlink timing of the extension carrier from its own signal transmission.

In the step 7, the base station can reconfigure the extension carrier with a synchronous cell in RRC signaling as needed.

In a fourth example, implicit determination is made and a PCell is used.

In the step 1, the user equipment set ups an RRC connection with the base station over a cell 1 and reports whether the user equipment supports aggregation of an extension carrier and/or a type of aggregated extension carrier supported by the user equipment to the base station in a user equipment capability report procedure.

In the step 2, the base station needs to increase the number of aggregated cells for the user equipment, for example, needs to add a cell 2 backward compatible with an LTE system and an extension carrier cell 3, due to an increase in amount of traffic. The cell 2 can be added in substantially the same procedure as the addition of a SCell whereas the cell 3 needs to be added with special consideration.

In the step 3, if capability report information of the user equipment reports indicates whether the user equipment supports aggregation of an extension carrier and/or a type of aggregated extension carrier supported by the user equipment, then the base station can determine the type of the extension carrier from a capability of the user equipment and a condition of cells currently supported by the base station or configured for the user equipment by the base station or configured and activated for the user equipment by the base station.

If the user equipment supports aggregation of a synchronous extension carrier and there is a cell with the same coverage with the extension carrier among activated cells currently aggregated for the user equipment, then the base station can determine that the type of the extension carrier is a synchronous extension carrier, and the base station needs to ensure downlink synchronization of a PCell with the extension carrier.

In the step 4, the base station configures the user equipment with the cell 2 and the cell 3.

For the extension carrier cell 3, if it is a synchronous extension carrier, then the base station does not need to configure it with PSS/SSS.

In the step 5, the user equipment receives configuration information of the cell 3, and if the extension carrier is not configured with PSS/SSS, then the user equipment can handle the extension carrier as a synchronous extension carrier and determine the dependency of downlink synchronization of the extension carrier upon the synchronous cell thereof; otherwise, the user equipment handles the extension carrier as an asynchronous extension carrier and obtains a downlink timing of the extension carrier from its own signal transmission.

Based upon the same inventive idea, an embodiment of the invention further provides a network-side apparatus, and since the apparatus addresses the problem under a similar principle to the method of determining a synchronous cell by a network-side apparatus according to the embodiment of the invention, reference can be made to the implementation of the method for an implementation of the apparatus, so a repeated description thereof will be omitted here.

As illustrated in FIG. 4, a network-side apparatus according to an embodiment of the invention includes a first determination module 40 and a first processing module 41.

The first determination module 40 is configured to determine an extension carrier to be configured for a user equipment; and The first processing module 41 is configured to determine a synchronous cell of the extension carrier upon determining that the extension carrier is a synchronous extension carrier.

Preferably the first processing module 41 is further configured to determine the synchronous cell of the extension carrier upon determining that the user equipment supports a synchronous extension carrier.

Preferably the first processing module 41 is further configured to determine from capability information reported by the user equipment whether the user equipment supports an extension carrier and/or a type of extension carrier supported by the user equipment.

Preferably the first processing module 41 is further configured to determine the synchronous cell by one of:

Selecting a Primary Cell (PCell) as a synchronous cell; or

Selecting a cell with the same coverage as the extension carrier as the synchronous cell amongst LTE backward compatible cells which are configured, or configured and activated for the user equipment by network; or Selecting a cell in the same frequency band as the extension carrier as the synchronous cell amongst the LTE backward compatible cells which are configured, or configured and activated for the user equipment by the network; or Selecting a cell with the same path loss as the extension carrier as the synchronous cell amongst the LTE backward compatible cells which are configured, or configured and activated for the user equipment by the network; or Selecting a cell with the difference in path loss from the extension carrier being no more than a threshold as the synchronous cell amongst the LTE backward compatible cells which are configured, or configured and activated for the user equipment by the network; or Selecting the cell with the highest cell index as the synchronous cell amongst the LTE backward compatible cells which are configured, or configured and activated for the user equipment by the network; or Selecting the cell with the lowest cell index as the synchronous cell amongst the LTE backward compatible cells which are configured, or configured and activated for the user equipment by the network; or Selecting the cell with a central frequency the closest to and lower than the central frequency of the extension carrier as the synchronous cell amongst the LTE backward compatible cells which are configured, or configured and activated for the user equipment by the network; or Selecting the cell with a central frequency the closest to and higher than the central frequency of the extension carrier as the synchronous cell amongst the LTE backward compatible cells which are configured, or configured and activated for the user equipment by the network; or Determining according to a cross-carrier scheduling relationship configured by the network that a cell scheduling the extension carrier is the synchronous cell.

Preferably the first processing module 41 is further configured to notify the user equipment of the identifier of the determined synchronous cell in a broadcast or dedicated signaling.

In addition, a network-side apparatus according to an embodiment of the invention includes at least one processor and at least one memory, wherein the at least one memory is configured to store executable instructions, when executed by the at least one processor, cause the network-side apparatus to determine an extension carrier to be configured for a user equipment and to determine a synchronous cell of the extension carrier upon determining that the extension carrier is a synchronous extension carrier.

Based upon the same inventive idea, an embodiment of the invention further provides a user equipment, and since the user equipment addresses the problem under a similar principle to the method of determining a synchronous cell by a user equipment according to the embodiment of the invention, reference can be made to the implementation of the method for an implementation of the user equipment, so a repeated description thereof will be omitted here.

Figure 5:
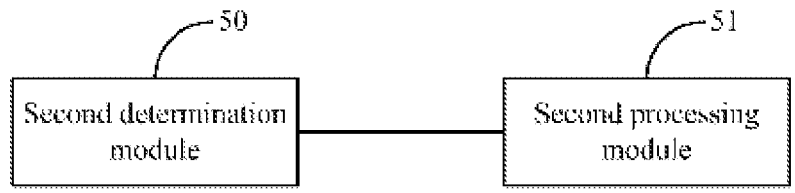
FIG. 5 is a schematic structural diagram of a user equipment according to an embodiment of the invention.

As illustrated in FIG. 5, a user equipment according to an embodiment of the invention includes a second determination module 50 and a second processing module 51.

The second determination module 50 is configured to determine an extension carrier to be configured for the user equipment by a network-side apparatus; and The second processing module 51 is configured to determine a synchronous cell of the extension carrier upon determining that the extension carrier is a synchronous extension carrier.

Preferably the second processing module 51 is further configured to report capability information of the user equipment to the network side before determining the synchronous cell.

Preferably the second processing module 51 is further configured to determine the synchronous cell by one of.

Selecting a Primary Cell (PCell) as a synchronous cell; or

Selecting the cell with the highest cell index as the synchronous cell amongst the LTE backward compatible cells which are configured, or configured and activated for the user equipment by the network; or Selecting the cell with the lowest cell index as the synchronous cell amongst the LTE backward compatible cells which are configured, or configured and activated for the user equipment by the network; or Selecting the cell with a central frequency the closest to and lower than the central frequency of the extension carrier as the synchronous cell amongst the LTE backward compatible cells which are configured, or configured and activated for the user equipment by the network; or Selecting the cell with a central frequency the closest to and higher than the central frequency of the extension carrier as the synchronous cell amongst the LTE backward compatible cells which are configured, or configured and activated for the user equipment by the network; or Determining according to a cross-carrier scheduling relationship configured by the network that a cell scheduling the extension carrier is the synchronous cell.

Preferably the second processing module 51 is further configured to determine that a cell corresponding to an identifier of synchronous cell received in a broadcast or dedicated signaling is a synchronous cell.

In addition, a user equipment according to an embodiment of the invention includes at least one processor and at least one memory, wherein the at least one memory is configured to store executable instructions, when executed by the at least one processor, cause the user equipment to determine an extension carrier to be configured for the user equipment by a network-side apparatus and to determine a synchronous cell of the extension carrier upon determining that the extension carrier is a synchronous extension carrier.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method of determining a synchronous cell, comprising:
    determining, by a network-side apparatus, an extension carrier to be configured for a user equipment; and
    determining, by the network-side apparatus, a synchronous cell to which the extension carrier to be synchronous upon determining that the extension carrier is a synchronous extension carrier;
    wherein before the network-side apparatus determines the synchronous cell to which the extension carrier to be synchronous, the method further comprises:
    determining, by the network-side apparatus, that the user equipment supports a synchronous extension carrier;
    wherein determining, by the network-side apparatus, that the user equipment supports a synchronous extension carrier comprises:
    determining, by the network-side apparatus, from capability information reported by the user equipment whether the user equipment supports an extension carrier and whether type of the extension carrier is a synchronous extension carrier or an asynchronous extension carrier.

2. The method according to claim 1, wherein the capability information comprises a part or all of:
    a protocol release supported by the user equipment;
    a capability indicator of whether the user equipment supports an extension carrier; and
    a type indicator of an extension carrier supported by the user equipment.

3. The method according to claim 1, wherein the network-side apparatus determines the synchronous cell by one of:
- selecting a Primary Cell (PCell) as the synchronous cell; or
- selecting a cell with a same coverage as the extension carrier as the synchronous cell amongst LTE backward compatible cells which are configured, or configured and activated for the user equipment by network; or
- selecting a cell belonging to a same frequency band as the extension carrier or a cell with a central frequency spaced from the central frequency of the extension carrier by no more than a threshold as the synchronous cell amongst the LTE backward compatible cells which are configured, or configured and activated for the user equipment by the network; or
- selecting a cell with a same path loss as the extension carrier as the synchronous cell amongst the LTE backward compatible cells which are configured, or configured and activated for the user equipment by the network; or
- selecting a cell with a difference in path loss from the extension carrier being no more than a threshold as the synchronous cell amongst the LTE backward compatible cells which are configured, or configured and activated for the user equipment by the network; or
- selecting a cell with a highest cell index as the synchronous cell amongst the LTE backward compatible cells which are configured, or configured and activated for the user equipment by the network; or
- selecting a cell with a lowest cell index as the synchronous cell amongst the LTE backward compatible cells which are configured, or configured and activated for the user equipment by the network; or
- selecting a cell with a central frequency closest to and lower than the central frequency of the extension carrier as the synchronous cell amongst the LTE backward compatible cells which are configured, or configured and activated for the user equipment by the network; or
- selecting a cell with a central frequency closest to and higher than the central frequency of the extension carrier as the synchronous cell amongst the LTE backward compatible cells which are configured, or configured and activated for the user equipment by the network; or
- determining according to a cross-carrier scheduling relationship configured by the network that a cell scheduling the extension carrier is the synchronous cell.

4. The method according to claim 1, wherein after the network-side apparatus determines the synchronous cell, the method further comprises:
- notifying, by the network-side apparatus, the user equipment of an identifier of the determined synchronous cell in a broadcast or dedicated signaling, wherein the dedicated signaling is Radio Resource Control (RRC) signaling or Media Access Control (MAC) signaling or Physical Control Channel (PDCCH) signaling.

5. The method according to claim 4, wherein the identifier of the synchronous cell is a central frequency and a Physical Cell ID (PCI); or an Evolved Universal Mobile Telecommunication System (UMTS) Terrestrial Radio Access Network (EUTRAN) Cell Global Identity (ECGI); or a cell index.

6. The method according to claim 1, wherein the synchronous cell is configured based upon system or based upon the user equipment.

7. The method according to claim 1, wherein the method is applicable with one or a combination of:
- downlink synchronization of the extension carrier with the synchronous cell;
- a same path-loss reference for the extension carrier and the synchronous cell;
- a same value of a mobility measurement result for the extension carrier and the synchronous cell;
- deactivation of the extension carrier along with the synchronous cell;
- scheduling of the extension carrier by the synchronous cell or by an Enhanced Physical Downlink Control Channel (E-PDCCH) of the extension carrier or by another cell configured at network side;
- separate cell indexes of the extension carrier and the synchronous cell respectively;
- a same downlink timing reference cell and a same uplink Timing Advance (TA) for uplink transmission to be used by the extension carrier and the synchronous cell if the extension carrier and the synchronous cell belong to a same TA group; and
- different downlink timing reference cells for uplink transmission to be used by the extension carrier and the synchronous cell if the extension carrier and the synchronous cell belong to different TA groups.

8. A method of determining a synchronous cell, comprising:
- determining, by a user equipment, an extension carrier to be configured for the user equipment by a network-side apparatus; and
- determining, by the user equipment, a synchronous cell to which the extension carrier to be synchronous upon determining that the extension carrier is a synchronous extension carrier;
- wherein before the user equipment determines the synchronous cell, the method further comprises:
- reporting, by the user equipment, capability information of the user equipment to network side so that the network side determines whether the user equipment supports an extension carrier and whether type of the extension carrier is a synchronous extension carrier or an asynchronous extension carrier.

9. The method according to claim 8, wherein the capability information comprises a part or all of:
- a protocol release supported by the user equipment;
- a capability indicator of whether the user equipment supports an extension carrier; and
- a type indicator of an extension carrier supported by the user equipment.

10. The method according to claim 8, wherein the user equipment determines the synchronous cell by one of:
- selecting a Primary Cell (PCell) as the synchronous cell; or
- selecting a cell with a highest cell index as the synchronous cell amongst the LTE backward compatible cells which are configured, or configured and activated for the user equipment by network; or
- selecting a cell with a lowest cell index as the synchronous cell amongst the LTE backward compatible cells which are configured, or configured and activated for the user equipment by the network; or
- selecting a cell with a central frequency closest to and lower than the central frequency of the extension carrier as the synchronous cell amongst the LTE backward compatible cells which are configured, or configured and activated for the user equipment by the network; or selecting a cell with a central frequency closest to and higher than the central frequency of the extension carrier as the synchronous cell amongst the LTE backward compatible cells which are configured, or configured and activated for the user equipment by the network; or determining according to a cross-carrier scheduling relationship configured by the network that a cell scheduling the extension carrier is the synchronous cell.

11. The method according to claim 8, wherein determining, by the user equipment, the synchronous cell comprises:
determining, by the user equipment, that a cell corresponding to an identifier of synchronous cell received in a broadcast or dedicated signaling is a synchronous cell.

12. The method according to claim 8, wherein the method is applicable with one or a combination of:
downlink synchronization of the extension carrier with the synchronous cell;
a same path-loss reference for the extension carrier and the synchronous cell;
a same value of a mobility measurement result for the extension carrier as the synchronous cell;
deactivation of the extension carrier along with the synchronous cell;
scheduling of the extension carrier by the synchronous cell or by an Enhanced Physical Downlink Control Channel (E-PDCCH) of the extension carrier or by another cell configured at network side;
separate cell indexes of the extension carrier and the synchronous cell respectively;
a same downlink timing reference cell and a same uplink Timing Advance (TA) for uplink transmission to be used by the extension carrier and the synchronous cell if the extension carrier and the synchronous cell belong to a same TA group; and
different downlink timing reference cells for uplink transmission to be used by the extension carrier and the synchronous cell if the extension carrier and the synchronous cell belong to different TA groups.

13. A user equipment for determining a synchronous cell, comprising:
one or more processors; and
a memory, wherein:
the memory stores therein one or more computer readable program codes, and the processor or processors are configured to execute the one or more computer readable program codes to perform:
determining an extension carrier to be configured for the user equipment by a network-side apparatus; and
determining a synchronous cell to which the extension carrier to be synchronous upon determining that the extension carrier is a synchronous extension carrier;

wherein the one or more processors are further configured to execute the one or more computer readable program codes to perform:
reporting capability information of the user equipment to the network side before determining the synchronous cell so that the network side determines whether the user equipment supports an extension carrier and whether type of the extension carrier is a synchronous extension carrier or an asynchronous extension carrier.

14. The user equipment according to claim 13, wherein the capability information comprises a part or all of:
a protocol release supported by the user equipment;
a capability indicator of whether the user equipment supports an extension carrier; and
a type indicator of an extension carrier supported by the user equipment.

15. The user equipment according to claim 13, wherein the one or more processors are further configured to execute the one or more computer readable program codes to determine the synchronous cell by one of:
selecting a Primary Cell (PCell) as the synchronous cell; or
selecting a cell with a highest cell index as the synchronous cell amongst the LTE backward compatible cells which are configured, or configured and activated for the user equipment by network; or
selecting a cell with a lowest cell index as the synchronous cell amongst the LTE backward compatible cells which are configured, or configured and activated for the user equipment by the network; or
selecting a cell with a central frequency closest to and lower than the central frequency of the extension carrier as the synchronous cell amongst the LTE backward compatible cells which are configured, or configured and activated for the user equipment by the network; or
selecting a cell with a central frequency closest to and higher than the central frequency of the extension carrier as the synchronous cell amongst the LTE backward compatible cells which are configured, or configured and activated for the user equipment by the network; or
determining according to a cross-carrier scheduling relationship configured by the network that a cell scheduling the extension carrier is the synchronous cell.

16. The user equipment according to claim 13, wherein the one or more processors are further configured to execute the one or more computer readable program codes to perform:
determining that a cell corresponding to an identifier of synchronous cell received in a broadcast or dedicated signaling is a synchronous cell.

* * * * *